Jan. 8, 1929.
A. J. BROWN
1,698,388
HOSIERY INSPECTION AND DISPLAY DEVICE
Filed July 25, 1927
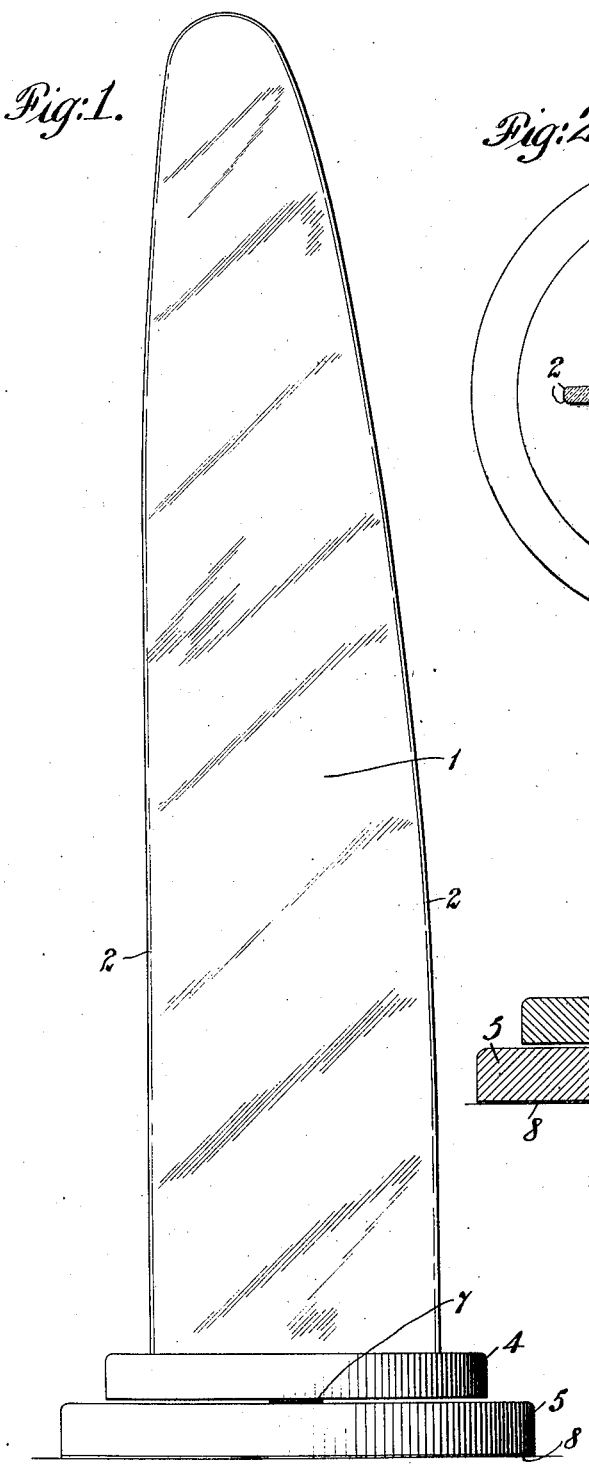
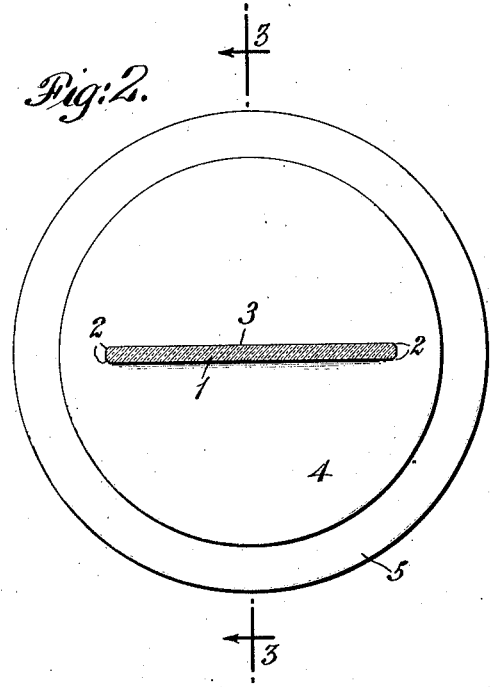
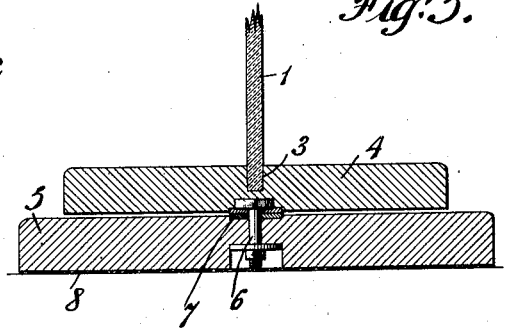
INVENTOR
Aaron J. Brown
BY C. Campbell Hinkle
ATTORNEY Patented Jan. 8, 1929.

1,698,388

UNITED STATES PATENT OFFICE.

AARON J. BROWN, OF NEW YORK, N. Y.

HOSIERY INSPECTION AND DISPLAY DEVICE.

Application filed July 25, 1927. Serial No. 208,092.

This invention relates to hosiery inspection and display device.

Women's silk stockings of today are quite sheer and delicate. Retail sellers of women's hose suffer considerable loss due to the fact that women purchasers desiring to test the sheerness of the stocking and to examine them for possible runs or other defects slip the stocking over their hands in the examination. Such examination is very often harmful to the stocking due to the catching of the rings in the sheer fabric or the cutting of the fabric by the finger nail or even a piece of loose flesh may cause a run in the stocking.

One of the objects of this invention is to provide an inspection device that will not harm the stocking when it is placed thereon.

Still another object of the invention is to provide an inspection device that will permit the party utilizing it to see through the stocking for any defects.

A further object of the invention is to provide an inspection device that may be used for display purposes as well.

Still another object of the invention is to provide an inspection and display device that is cheap to manufacture, neat, clean and attractive in appearance.

Referring to the drawings:

Figure 1 is a view in side elevation of a device embodying the principles of my invention.

Figure 2 is a top plan view of Figure 1 with the shaft of glass section.

Figure 3 is a sectional view of Figure 2 along the lines 3, 3, looking in the direction of the arrows.

In carrying out my invention I propose to provide a shaft of heavy plate glass 1 having bevelled edges 2 and shaped to conform to the shape of the stocking. Shaft 1 is adapted to fit into slot 3 of rotatable base 4. Shaft 1 is secured in slot 3 by cement or in any well known manner. Base 4 is pivotally connected to base 5 by pivot connection 6. Bearing plate 7 may also be used so as to permit of greater freedom of rotation. The bottom of base 5 is covered with heavy felt 8 which is cemented or secured to base 5 in any well known manner. The bases must be of sufficient size and weight so that the device is not easily tipped over. The bases 4 and 5 may be of metal or wood.

Modifications of my invention might be made such as the use of a heavy wire loop or frame in place of the glass shaft and allowing of visual inspection through the stocking, and still fall within the scope of my invention. Such a frame or form is not as desirable as the glass shaft since silk will slide more readily on glass and the threads will not catch thereon. Glass makes an ideal form to slide stockings on for inspection and it being transparent permits of a real inspection of the stocking since the sheer hose can be seen through and defects noted at once. As the stocking will slide very easily and quickly over the glass shaft it will permit of quick inspection which is a desirable feature in department stores where a large number of customers may attend at one time. A proper inspection of the stocking which can be seen both by the salesgirl and the purchaser will tend to prevent fraudulent returns of merchandise which at the time of the sale were in perfect condition but which may have become damaged after having passed to the possession of the purchaser.

The device is simple of construction and of relatively cheap material and yet is sufficiently attractive in appearance to permit of its use not only as an inspection device but also as a stocking display device.

What I claim is:—

A hosiery inspection and display device comprising a shaft of relatively thick transparent glass mounted in a rotatable base, said glass having one edge almost a straight line and the other edge curved in order that the free end may terminate in a rounded portion of such size as to permit insertion in the toe of the stocking and to stretch the remainder of the stocking to enable inspection thereof, said shaft having rounded edges.

Signed at New York, in the county of New York, and State of New York, this 14th day of July, A. D. 1927.

AARON J. BROWN.